United States Patent

[11] 3,533,435

| [72] | Inventor | Johannes Dirk Jacobus Uys<br>Flat 33, Majara, Nelspruit, Transvaal<br>Province, Republic of South Africa |
|---|---|---|
| [21] | Appl. No. | 646,511 |
| [22] | Filed | June 16, 1967 |
| [45] | Patented | Oct. 13, 1970 |
| [32] | Priority | June 24, 1966 |
| [33] | | South Africa |
| [31] | | 66/3,733 66/3,736 |

[54] RISER AND STANDPIPE CONNECTIONS IN SPRINKLER IRRIGATION
9 Claims, 2 Drawing Figs.

[52] U.S. Cl..................................... 137/322, 251/149.1
[51] Int. Cl..................................... F16l 29/00
[50] Field of Search........................................ 137/322, 272, 287; 251/333, 149.1, 149.3, 149.5, 149.6

[56] References Cited
UNITED STATES PATENTS

| 951,519 | 3/1910 | Bacigalupi.................. | 137/322 |
| 1,797,363 | 3/1931 | Pierce....................... | 251/149.5 |
| 2,898,128 | 8/1959 | Shohan....................... | 137/322 |

*Primary Examiner*—M. Cary Nelson
*Assistant Examiner*—William R. Cline
*Attorney*—Young & Thompson ABSTRACT: For a sprinkler irrigation system a riser and standpipe combination in which the standpipe fits over the riser and has an actuating member which depresses a valve in the riser while the riser is fitted at the top with an adjustable valve seat for pressure control purposes.

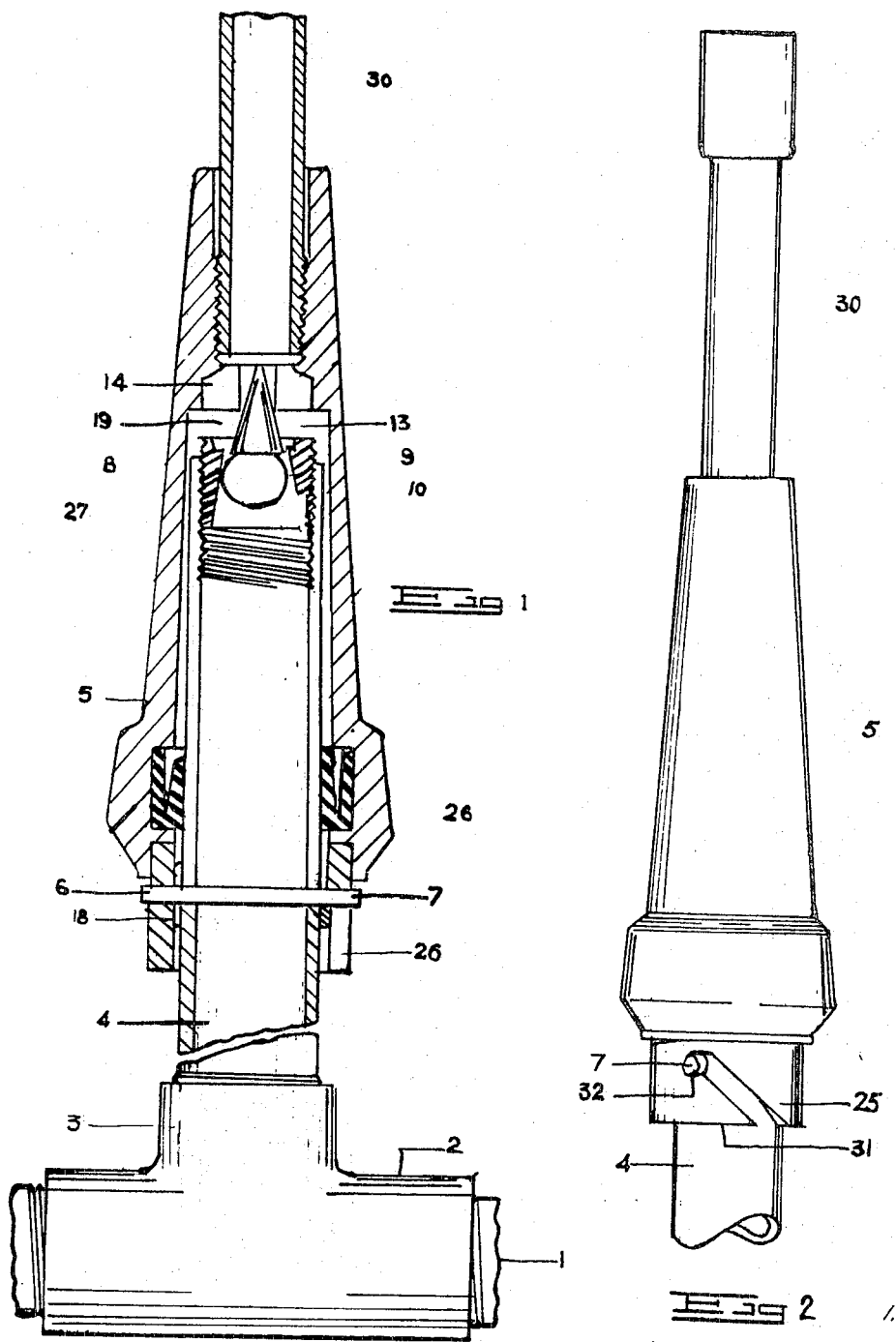

RISER AND STANDPIPE CONNECTIONS IN SPRINKLER IRRIGATION

This invention relates to valve adjustment in riser units of sprinkler irrigation systems.

An irrigation system usually comprises a series of pipes on or under the ground which are all connected to a source of water under pressure. At selected points along each pipe there is what is known as a riser unit. The riser units cooperate with standpipes which are detachable. Usually not all riser units are fitted with standpipes at the same time.

A riser unit is conventionally provided with a valve member (usually a ball) which is biased to closure by the pressure in the pipe. When the standpipe is attached a fitting on the standpipe depresses the valve member and allows water under pressure to go up the standpipe and to the sprinkler unit carried at the top of the standpipe.

In designing an irrigation system of the kind in question the area which each sprinkler unit is intended to cover is predetermined. For various reasons, length of pipe, rise and fall of the ground and so on, the pressure in the pipe at each riser unit is not exactly the same. It is therefore desirable that the pressure of flow through the riser units be controlled to ensure even distribution and precipitation of irrigation water.

It has been proposed to provide riser units or standpipes with flow control valves or pressure regulators. These flow control devices are relatively fragile and expensive. If, in order to reduce the number of flow control valves required, they are fitted to the standpipes, it means that a flow control operation has to be carried out each time that a standpipe is moved from one riser to another.

An object of the invention is to provide a riser unit and standpipe combination in which the valve that closes off the riser unit serves for flow control purposes.

Use of the riser and standpipe combination of the invention leads to the following advantages. Firstly the important desideratum of controlled pressure at all sprinkler positions is achieved, thus leading to evenness of distribution and precipitation. Secondly effortless, quick and positive coupling of the portable standpipes facilitate scheme operation which may involve that standpipes be disconnected and reconnected twice to six times every 24 hours.

Finally pressure control is achieved with the minimum of manipulation. In use it has been found that over the operating range of pressures, an adjustment to effect a unit change in pressure usually involved a fixed part of a rotation of the bush 8. Thus with the illustrated embodiment half a turn of the bush effects a change in pressure of 1 lb. per square inch in an operating range of 80 lbs. per square inch.

Preferably the standpipe has a flared lower end fitting around the riser and the valve seat is provided at the upper extremity of the riser and preferably also the valve seat is provided by a member that can be adjusted up and down the bore of the riser as by screwing.

Thus the flow to the sprinkler unit is adjusted simply by raising or lowering the valve seat. Since all standpipes in a given installation can be made interchangeable and the locking mechanisms on the risers can be made identical, once a riser unit has been set for a predetermined flow, no adjustment is necessary until wear takes place or there is a change in the fundamental conditions of the system.

Also in the preferred form of the invention the standpipe has a flared lower end fitting around the riser and the valve seat is provided at the upper extremity of the riser. This has the advantage that the riser, which is fixed in position, has no open socket in which dirt can collect. Dirt which does collect on the upper extremity can be brushed away before fitting the standpipe.

To decrease the sensitivity in the operating range of the adjustment when the valve seat is raised or lowered the valve seat is a circular aperture topping a conical bore flaring downwardly into the cavity of the riser and the standpipe is provided with a conical formation with its axis aligned with the axis of the frusto-conical bore.

The invention is further discussed with reference to the accompanying drawings, in which:

FIG. 1 is a vertical section through a riser and standpipe assembly, and

FIG. 2 is an external view of the standpipe.

In FIG. 1 a riser 4 is seen connected to the transverse socket 3 of a T-piece 2 connected into a pipeline 1.

At the top of the riser 4 there is a bush 8 with external threads 9 engaged with the internally threaded mouth of the riser 4. A pin 6 crosses the lower end of the riser 4 serving to keep captive a ball 10 and also having projecting ends 7 serving as bayonet connection pins for purposes to be described later on.

The bush 8 is formed from rigid polyvinyl chloride as shown with a circular aperture 13 topping a frusto-conically flared bore 27 leading to the cavity of the riser 4. In the absence of a standpipe and with water in the pipeline 1, the water pressure forces the ball 10 to seat on the aperture 13 thus effectively closing off the riser at is upper end. The bush 8 also has slots 19 at its top for adjustment purposes.

The standpipe has a lower end 5 fitting around the riser 4 and provided with bayonet slots 25 adapted to cooperate with the pins 7. An annular spacer 18 around the riser 4 serves to centre the standpipe around the riser 4. There is also a sealing ring 26 of conventional design. During the latter part of the movement of the standpipe over the riser and once assembled, the standpipe seats firmly on the riser.

The valve 10 is depressed to the position shown by means of a frusto-conical formation 14, held in the bore of the standpipe at a fixed position by means of a spider, axially aligned with the axis of the frusto-conical bore, 27 and formed with a depression to fit on the ball 10.

To adjust the water pressure in the upper part 30 of the standpipe 5 the bush 8 is served up or down by a tool engaging with the slots 19. The adjustment is effected with the standpipe removed. Adjustment will only take place at startup and thereafter occasionally wear on the complementary surfaces caused by silty water can readily be adjusted for and does not require replacement of the parts, the durability of which is thus increased.

A bayonet slot 25 is illustrated in greater detail in FIG. 2. The gap 31 at the edge of the end 5 leads into a helical slot of the quick helix type and terminating in a detent notch 32 for the ends 7. This construction simplifies removal of the of the standpipe from the riser and also ensures that the valve closes rather more gently than usual so that water hammer is reduced to a remarkable extent over the whole irrigation system.

I claim:

1. Sprinkler irrigation apparatus comprising in combination, a riser connected to a pipeline, a valve seat in the riser providing an inwardly facing valve seat, a valve adapted to close off flow from the riser under action of pressure in the pipeline, a standpipe adapted to telescope relatively on to the riser and to seal on the riser, an actuating member attached to the standpipe the tip of which presses the valve from its seat when the standpipe is put on to the riser to allow flow up the standpipe, means so to lock the standpipe on the riser that the tip of the actuating member always assumes a fixed position when the standpipe is locked on the riser, and means for adjusting one of the surfaces bounding the gap between the valve and its seat in the fixed position relatively to the fixed position of the tip of the actuating member.

2. The apparatus claimed in claim 1 in which the standpipe has a flared lower end fitting around the riser and the valve seat is provided at the upper extremity of the riser.

3. The apparatus claimed in claim 2 in which the valve seat is provided by a member that can be adjusted up and down the bore of the riser.

4. The apparatus claimed in claim 3 in which the seat member can be screwed up and down the bore of the riser.

5. The apparatus claimed in claim 4 in which the valve seat is a circular aperture with a frusto-conical bore leading from it towards the lower end of the riser the valve being a ball.

6. The apparatus claimed in claim 5 in which the actuating member is a conical formation with its axis aligned with the axis of the frusto-conical bore, with its base shaped to contact the ball and with its apex on a spider spanning the standpipe.

7. The apparatus claimed in claim 6 in which the standpipe and the riser are provided with at least one pair of interengaging pin and slot bayonet formations to lock the standpipe and the riser together in the fixed position.

8. The apparatus claimed in claim 7 in which the slot member of the bayonet formations is helically inclined around the periphery of the member on which it is formed between the lead-in point for the pin and the detent notch.

9. The apparatus claimed in claim 8 in which the helix is a quick helix.